US012637805B2

(12) United States Patent
Okada

(10) Patent No.: US 12,637,805 B2
(45) Date of Patent: May 26, 2026

(54) IMAGE FORMING METHOD AND INK SET FOR INK JET TEXTILE PRINTING

(71) Applicant: Konica Minolta, Inc., Tokyo (JP)

(72) Inventor: Takuya Okada, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 160 days.

(21) Appl. No.: 18/523,169

(22) Filed: Nov. 29, 2023

(65) Prior Publication Data

US 2024/0191428 A1      Jun. 13, 2024

(30) Foreign Application Priority Data

Dec. 7, 2022      (JP) ................................. 2022-195745

(51) Int. Cl.
| | |
|---|---|
| *B41J 3/407* | (2006.01) |
| *B41M 5/00* | (2006.01) |
| *C09D 11/033* | (2014.01) |
| *C09D 11/10* | (2014.01) |
| *C09D 11/102* | (2014.01) |
| *C09D 11/107* | (2014.01) |
| *C09D 11/322* | (2014.01) |
| *C09D 11/40* | (2014.01) |
| *C09D 11/54* | (2014.01) |
| *D06P 1/44* | (2006.01) |

(Continued)

(52) U.S. Cl.
CPC .............. *D06P 5/30* (2013.01); *B41J 3/4078* (2013.01); *B41M 5/0017* (2013.01); *C09D 11/033* (2013.01); *C09D 11/10* (2013.01); *C09D 11/102* (2013.01); *C09D 11/107*

(2013.01); *C09D 11/322* (2013.01); *C09D 11/40* (2013.01); *C09D 11/54* (2013.01); *D06P 1/44* (2013.01); *D06P 1/5257* (2013.01); *D06P 1/5285* (2013.01); *D06P 1/54* (2013.01); *D06P 5/002* (2013.01); *B41M 5/00* (2013.01)

(58) Field of Classification Search
CPC ........ D06P 5/30; D06P 1/5257; D06P 1/5285; D06P 5/002; D06P 1/44; D06P 1/54; B41J 3/4078; B41M 5/0017; B41M 5/00; C09D 11/033; C09D 11/102; C09D 11/107; C09D 11/322; C09D 11/40; C09D 11/54; C09D 11/10
See application file for complete search history.

(56) References Cited

FOREIGN PATENT DOCUMENTS

JP      2008-231617 A      10/2008
JP      2010150454 A   *   7/2010   ............. C09D 11/00
(Continued)

OTHER PUBLICATIONS

Office Action ("Communication") dated Feb. 9, 2026, which was issued for the corresponding Japanese patent application No. 2022-195745, 12 pages, with English translation.

*Primary Examiner* — Yaovi M Ameh

(74) *Attorney, Agent, or Firm* — LUCAS & MERCANTI, LLP

(57) ABSTRACT

The image forming method of the present invention includes applying an ink and a first treatment liquid onto a fabric in a wet-on-wet manner to each other, the ink containing a pigment and a first resin, a first treatment liquid containing a second resin that reacts with or interacts with the first resin to aggregate. The viscosity of the first treatment liquid at 25° C. is lower than the viscosity of the ink at 25° C.

15 Claims, 1 Drawing Sheet

(51) Int. Cl.
    *D06P 1/52*            (2006.01)
    *D06P 1/54*            (2006.01)
    *D06P 5/00*            (2006.01)
    *D06P 5/30*            (2006.01)

(56)           References Cited

FOREIGN PATENT DOCUMENTS

| JP | 2010-234582 | A |   | 10/2010 |   |
|----|-------------|---|---|---------|---|
| JP | 2017132946 | A | * | 8/2017 | ............. C09D 11/54 |
| JP | 2020040330 | A | * | 3/2020 | ............. B41M 5/00 |
| WO | WO-2022186396 | A1 | * | 9/2022 | ............. D06P 5/002 |

* cited by examiner

IMAGE FORMING METHOD AND INK SET FOR INK JET TEXTILE PRINTING

CROSS REFERENCE TO RELATED APPLICATIONS

The entire disclosure of Japanese Patent Application No. 2022-195745, filed on Dec. 7, 2022 is incorporated herein by reference in its entirety.

BACKGROUND

Technological Field

The present invention relates to an image forming method and an ink set for ink jet textile printing.

Description of Related Art

As a textile printing method, exhaust textile printing in which textile printing is performed by immersing a fabric in a bath filled with a dye has been conventionally known. However, since a long time is required for dyeing, production efficiency is low. In recent years, so-called ink jet printing in which an image is formed on a fabric by an ink jet method has been widely performed because dyeing can be performed in a short time and manufacturing efficiency is high.

In inkjet textile printing, fine droplets of ink are discharged from an inkjet recording head to land on a fabric, thereby forming an image. As an ink used in ink jet printing, a dye ink is a mainstream, but the use of a pigment ink that can omit a post-treatment such as a washing step of washing away a dye that has not been dissolved or reacted has been studied.

A pigment ink exhibits a high color developing property by causing pigment particles to remain on the surface of the fabric, but a pigment ink has a tendency that the fixability of the pigment particles is low and the friction fastness is poor as compared with a dye ink. Therefore, studies have been conducted to increase the fixability of pigment particles and increase the friction fastness by adding a binder resin (resin particle) to the ink or applying a post-treatment liquid onto the ink.

For example, PTL 1 discloses a method in which a pretreatment liquid, an inkjet ink, and a post-treatment liquid are applied to a fabric in this order and then dried to form an image. The pretreatment liquid contains a polyvalent metal salt and water: the ink contains a pigment, an anionic water-dispersible resin, a solvent and water; and the post-treatment liquid contains an anionic water-dispersible resin and water. In addition, it is disclosed that a drying step is further performed between the application of the pretreatment liquid and the application of the ink, and between the application of the ink and the application of the post-treatment liquid.

PTL 2 discloses a method in which a pretreatment liquid, an inkjet ink and a post-treatment liquid are applied in this order to a fabric and then dried to form an image. The pre-treatment liquid contains a thermoplastic resin, a cationic surfactant and water; the ink contains a pigment, an anionic dispersant, a water-soluble organic solvent and water; and the post-treatment liquid contains an anionic compound and water or a water-soluble organic solvent. Further, it is disclosed that a drying step is performed between the application of the pretreatment liquid and the application of the ink.

PTL 3 discloses a method of forming an image by applying a pretreatment liquid, a coloring ink composition, and a clear ink composition in this order in a wet state, and then drying them. It is disclosed that the coloring ink composition contain a resin that is aggregated by a reactant contained in the pretreatment liquid and the clear ink composition includes a resin that is not aggregated by the reactant contained in the pretreatment liquid.

CITATION LIST

Patent Literatures

PTL 1
  Japanese Unexamined Patent Publication No. 2010-150454
PTL 2
  Japanese Unexamined Patent Publication No. 2008-231617
PTL 3
  Japanese Unexamined Patent Publication No. 2017-132946

SUMMARY OF INVENTION

Technical Problem

However, in the methods disclosed in PTLs 1 and 2, the pretreatment liquid is applied and dried, and then the ink or the post-treatment liquid is applied (wet-on-dry application). Therefore, since the components in the pretreatment liquid are not sufficiently mixed with the components in the ink and the post-treatment liquid, the components in the ink and the post-treatment liquid are not easily aggregated by the components in the pretreatment liquid, and sufficient friction fastness cannot be obtained.

In contrast, since the pretreatment liquid, the ink, and the post-treatment liquid are applied to the fabric in a wet state with each other (wet-on-wet application) in the method of PTL 3, the liquids are more likely to be mixed together than in the methods of PTLs 1 and 2. However, in PTL 3, the resin in the ink tends to aggregate (due to the aggregating agent applied to the fabric) before the post-treatment liquid sufficiently penetrates into the fabric, at least depending on the relationship between the post-treatment liquid and the viscosity of the ink. Therefore, the resin in the post-treatment liquid did not sufficiently interact with the resin in the ink, and sufficient friction fastness was not obtained.

The present invention has been made in consideration of the above-described circumstances, and an object thereof is to provide an image forming method and an ink set for inkjet textile printing that can form an image having high friction fastness.

SUMMARY

The present invention relates to the following image forming method and ink set for ink jet textile printing.

The image forming method of the present invention includes applying an ink and a first treatment liquid onto a fabric in a wet-on-wet manner to each other, the ink containing a pigment and a first resin, a first treatment liquid containing a second resin that reacts with or interacts with the first resin to aggregate, in which a viscosity of the first treatment liquid at 25° C. is lower than a viscosity of the ink at 25° C.

An ink set for ink jet textile printing according to an embodiment of the present invention contains an ink containing a pigment, a first resin, a water-soluble organic solvent, and water; and a first treatment liquid containing a water-soluble organic solvent, water, and a second resin that reacts with or interacts with the first resin to aggregate, in which a viscosity of the first treatment liquid at 25° C. is lower than a viscosity of the ink at 25° C.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1A:
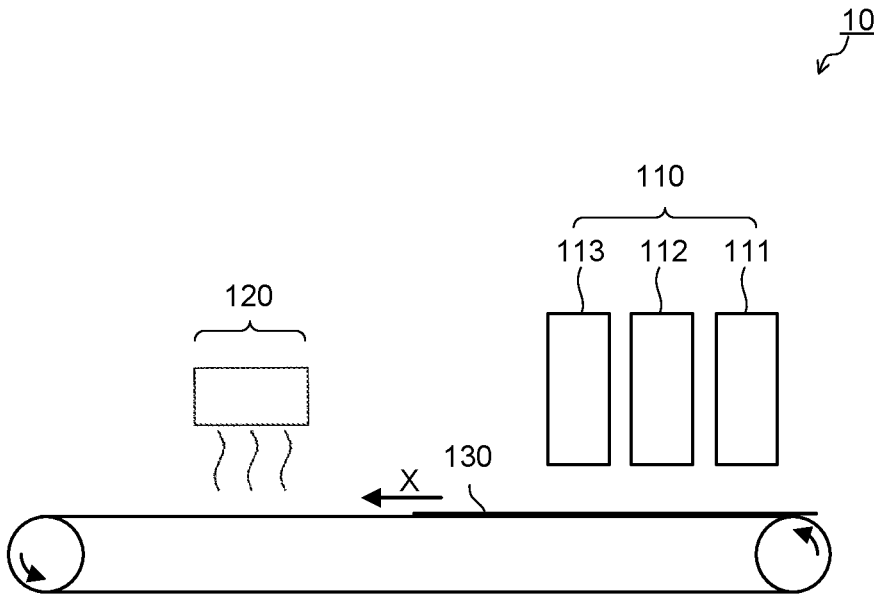
FIGS. 1A and 1B are schematic diagram illustratings a configuration of an image forming apparatus used for an image forming method according to an embodiment of the present invention.

Hereinafter, one or more embodiments of the present invention will be described with reference to the drawings. However, the scope of the invention is not limited to the disclosed embodiments.

In order to improve the friction fastness, it is effective to sufficiently bring the resin contained in the ink and the resin contained in the first treatment liquid (e.g., post-treatment liquid) into contact with each other in the vicinity of the surface layer of the fabric, thereby aggregating the resins. In order to achieve this, it is important to control the permeability of the ink and the first treatment liquid into the fabric.

As a result of intensive studies on the above problems, the present inventors have found that an image-formed product having high friction fastness can be obtained by applying at least an ink and a first treatment liquid to each other in a wet-on-wet manner and setting the viscosity of the first treatment liquid to be lower than the viscosity of the ink.

Although this mechanism is not clear, it is presumed as follows.

First, when the ink and the first treatment liquid are applied in a wet-on-wet manner, an aggregation component (for example, a pigment or a binder resin) in the ink and an aggregation component (for example, a binder resin) in the first treatment liquid easily flow and easily come into contact with each other. Thus, the aggregating components in the ink and the first treatment liquid can interact with each other to sufficiently aggregate.

Here, when the viscosity of the first treatment liquid is higher than the viscosity of the ink, the permeability of the ink into the fabric in the depth direction is higher than the permeability of the first treatment liquid into the fabric in the depth direction. Therefore, since the amount of ink that permeates without being aggregated by the first treatment liquid increases, it is difficult to increase the friction fastness. In contrast, by making the viscosity of the first treatment liquid lower than the viscosity of the ink, it is possible to reduce the ratio of the ink that permeates without being aggregated by the first treatment liquid. As a result, the components in the ink and the components in the first treatment liquid can be sufficiently brought into contact with each other and aggregated (see FIG. 1B described below). Thus, an image having high friction fastness can be formed.

That is, the image forming method of the present invention includes a step of applying an ink and a first treatment liquid to a fabric in a wet-on-wet manner, and the viscosity of the first treatment liquid is made lower than the viscosity of the ink.

Further, it is preferable that the second treatment liquid (for example, the pretreatment liquid) is applied with the ink in a wet-on-wet manner, and the viscosity of the second treatment liquid is set to be lower than the viscosity of the first treatment liquid. When the viscosity of the second treatment liquid is further decreased, the aggregating agent contained in the second treatment liquid can be more easily permeated into the inside of the fabric. As a result, the first resin contained in the ink can easily interact or react with the aggregating agent in the second treatment liquid, and the ratio of the ink that permeates without being aggregated by the aggregating agent can be further reduced. That is, since the pigment or the binder resin in the ink can be more easily aggregated in the vicinity of the surface layer of the fabric by the aggregating agent contained in the second treatment liquid, the pigment or the binder resin in the ink which interacts or reacts with the first treatment liquid increases. Thereby, the color density and the texture can be further improved.

First, the ink, the first treatment liquid, and the second treatment liquid used in the image forming method according to the embodiment of the present invention will be described.

1. Ink, First Treatment Liquid, and Second Treatment Liquid 1-1. Ink

The ink contains a pigment, a first resin, a water-soluble organic solvent, and water.

1-1-1. Pigment

The pigment contained in the ink is not particularly limited, but is preferably, for example, any one of organic pigments and inorganic pigments having the following numbers described in Colour Index.

Examples of orange or yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 83, C.I. Pigment Yellow 93, C.I. Pigment Yellow 94, C.I. Pigment Yellow 128, C.I. Pigment Yellow 138, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 213.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88, and Pigment Orange 13, 16, 20, and 36.

Examples of blue or cyan pigment include Pigment Blue 1, 15, 15:1, 15:2, 15:3, 15:4, 15:6, 16, 17-1, 22, 27, 28, 29, 36, and 60.

Examples of green pigment include Pigment Green 7, 26, 36, and 50. Examples of the yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of the black pigment include Pigment Black 7, 28, and 26.

Examples of a commercially available product of the pigment include Chromofine Yellow 2080, 5900, 5930, AF-1300, and 2700 L, Chromofine Orange 3700L, 6730, Chromofine Scarlet 6750, Chromofine Magenta 6880, 6886, 6891N, 6790, and 6887, Chromofine Violet RE, Chromofine Red 6820 and 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromofine Green 2GN, 2GO, 2G-550D, 5310, 5370, and 6830, Chromofine Black A-1103, Seikafast Yellow 10GH, A-3, 2035, 2054, 2200, 2270, 2300, 2400 (B), 2500, 2600, ZAY-260, 2700(B), 2770, Seikafast Red 8040, C405(F), CA120, LR-116, 1531B, 8060R, 1547, ZAW-262, 1537B, GY, 4R-4016, 3820, 3891, ZA-215, Seikafast Carmine 6B1476T-7, 1483LT, 3840, and 3870, Seikafast Bordeaux 10B-430, Seikalight Rose R40, Seikalight Violet B800 and 7805, Seikafast Maroon 460N, Seikafast Orange 900 and 2900, Seikalight Blue C718 and A612, Cyanine blue 4933M, 4933GN-EP, 4940, and 4973 (manufactured by Dainichiseika Color & Chemicals Mfg. Co., Ltd.), KET Yellow 401, 402, 403, 404, 405, 406, 416, and 424, KET Orange 501, 301, 302, 303, 304, 305, 306, 307, 308, 309, 310, 336, 337, 338, and 346, KET Blue 101, 102, 103, 104, 105, 106, 111, 118, and 124, and KET Green 201 (manufactured by DIC Corporation); Colortex Yellow 301, 314, 315, 316, P-624, 314, U10GN, U3GN, UNN, UA-414, U263, Finecol Yellow T-13, T-05, Pigment Yellow 1705, Colortex Orange 202, Colortex Red 101, 103, 115, 116, D3B, P-625, 102, H-1024, 105C, UFN, UCN, UBN, U3BN, URM, UGN, UG276, U456, U457, 105C, USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (manufactured by SANYO COLOR WORKS, Ltd.), Lionol Yellow 1405G, Lionol Blue FG7330, FG7350, FG7400G, FG7405G, ES, ESP-S (manufactured by Toyo Ink Corporation), Toner Magenta E02, Permanent Rubin F6B, Toner Yellow HG, Permanent Yellow GG-02, and Hostapeam Blue B2G (manufactured by Hoechst Industries): Novoperm P-HG, Hostaperm Pink E, and Hostaperm Blue B2G (manufactured by Clariant), carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (manufactured by Mitsubishi Chemical).

The pigment is preferably further dispersed with a pigment dispersant from the viewpoint of improving dispersibility in the ink. The pigment dispersant will be described later.

In addition, the pigment may be a self-dispersible pigment. The self-dispersible pigment is obtained by modifying the surface of a pigment particle with a group having a hydrophilic group, and includes a pigment particle and a group having hydrophilicity bonded to the surface of the pigment particle. Examples of the hydrophilic group include carboxy group, sulfonic acid group, and phosphorus-containing group. Examples of the phosphorus-containing group include phosphoric acid group, phosphonic acid group, phosphinic acid group, phosphite group and phosphate group.

Commercial examples of self-dispersible pigments include Cab-0-Jet™ 200K, 250C, 260M, and 270V (sulfonic acid group-containing self-dispersible pigments), Cab-0-Jet™ 300K (carboxylic acid group-containing self-dispersible pigment), and Cab-0-Jet™ 400K, 450C, 465M, 470V, and 480V (phosphoric acid group-containing self-dispersible pigments) from Cabot Corporation.

When the pigment is a white pigment, the color transfer due to friction and the like are less likely to be a problem, but when the pigment is a colored pigment, the color transfer due to friction and the like are particularly likely to be a problem. The present invention is particularly effective when the pigment is a colored pigment.

The content of the pigment in the ink is not particularly limited, but is preferably 0.3 to 12% by mass with respect to the ink from the viewpoint of easily adjusting the viscosity of the ink to the range described below and forming an image with a higher density. When the content of the pigment is 0.3% by mass or more, the color of an image to be obtained tends to be vivid, and when the content of the pigment is 5% by mass or less, the viscosity of the ink does not become too high, and thus the ejection stability not easily impaired. From the same viewpoint, the content of the pigment is more preferably 0.5 to 8% by mass with respect to the ink.

The content of the pigment in the ink is preferably less than the content of the second resin in the first treatment liquid. This is because the friction fastness can be further improved by coating the pigment with a sufficient amount of the second resin.

1-1-2. First Resin

The first resin aggregates by reacting or interacting with the second resin contained in the first treatment liquid. Thus, the pigment and the like in the ink can be easily fixed to the fabric. The first resin is preferably a water-dispersible resin (resin particle). The water-dispersible resin may be self-emulsifying resin particles into which a hydrophilic group has been introduced, or may be forced-emulsifying resin particles which become water-dispersible through the use of an external emulsifier. From the viewpoint of suppressing bleed-out, a self-emulsifying type is preferable.

The glass transition temperature (Tg) of the first resin is preferably low from the viewpoint of more easily maintaining the texture of the fabric. Specifically, the Tg of the first resin contained in the ink is preferably lower than the Tg of the second resin contained in the first treatment liquid. The Tg of the first resin is preferably −70 to 50° C., more preferably −50 to 30° C. The Tg of the first resin can be measured at a temperature increase rate of 10° C./min in accordance with JIS K7121.

The first resin has an ionic group that forms a pair with the ionic group of the second resin in the first treatment liquid, and may have a cationic group or an anionic group. Since the second resin contained in the first treatment liquid preferably contains a resin having a cationic group (hereinafter, also referred to as a "cationic resin"), the first resin contained in the ink preferably contains a resin having an anionic group (hereinafter, also referred to as an "anionic resin"). Examples of the anionic group include carboxy group, sulfonic acid group, and phosphonic acid group.

Examples of the first resin include (meth)acrylic resin, polystyrene resin, polyurethane resin, and polyester resin each having an anionic group. Among these, from the viewpoint that the Tg of the resin is appropriately low or from the viewpoint of flexibility, a (meth)acrylic resin having an anionic group or a polyurethane resin having an anionic group is preferable.

((Meth)Acrylic Resin Having Anionic Group)

The (meth)acrylic resin having an anionic group is a polymer of a (meth)acrylic monomer, or a copolymer of a (meth)acrylic monomer with another monomer copolymerizable therewith. At least one of the (meth)acrylic monomer and the other monomer, preferably the (meth)acrylic monomer, has an anionic group. The (meth)acrylic monomer is a monomer having a (meth)acryloyl group. The (meth)acrylic is a concept including both methacrylic and acrylic.

Examples of the (meth)acrylic monomer having an anionic group include acrylic acids and methacrylic acids. Other examples of the (meth)acrylic monomer include (meth)acrylic acid esters such as methyl (meth)acrylate, ethyl (meth)acrylate, and hydroxyethyl (meth)acrylate; (meth)acrylamides: and (meth)acrylic monomers having no anionic group, such as (meth)acrylonitrile.

Examples of other copolymerizable monomers include ethylenically unsaturated carboxylic acids (for example, maleic acid and itaconic acid); styrenes (for example, styrene, α-methylstyrene, vinyltoluene); saturated fatty acid vinyls (for example, vinyl acetate and vinyl propionate); vinyl compounds (for example, 1,4-divinyloxybutane and divinylbenzene); monofunctional monomers such as allyl compounds (for example, diallyl phthalate and triallyl cyanurate); multifunctional (meth)acrylates such as diethylene glycol di(meth)acrylate, 1,6-hexanediol di(meth)acrylate, propylene glycol di(meth)acrylate, and N,N'-methylenebis (acrylamide), and bifunctional or higher functional monomer such as polyfunctional acrylamide.

Among these, from the viewpoint of lowering the Tg of the first resin, the (meth)acrylic monomer preferably includes an acrylic acid or an acrylic acid alkyl ester. The acrylic acid alkyl ester is preferably C4 to C12 alkyl acrylate, more preferably N-butyl acrylate or 2-ethylhexyl acrylate.

(Urethane Resin Having Anionic Group)

The urethane resin having an anionic group may be any one of a polyether-type urethane resin, a polyester-type urethane resin, and a polycarbonate-type urethane resin. In addition, the urethane resin having an anionic group is preferably a self-emulsifying type. The self-emulsifying urethane resin can be, for example, a polyaddition reaction product of a polyhydric alcohol having an anionic group and a polyhydric isocyanate.

Examples of commercially available products of the urethane resin include TAKELAC® W-6010 (polycarbonate-based/anionic type), TAKELAC® W-6020 (ether-based/anionic type), TAKELAC® W-6061 (ether-based/anionic type), TAKELAC® W-405 (ester-based/anionic type), TAKELAC® W-605 (ester-based/anionic type), TAKELAC® WS-5000 (polyester-based/anionic type), and TAKELAC® WS-4000 (polycarbonate-based/anionic type) (all manufactured by Mitsui Chemicals, Inc.), and SUPERFLEX® 126 (ether/ester-based, anionic type), SUPERFLEX® 130 (ether-based, anionic type), SUPERFLEX® 150 (ether/ester-based, anionic type), SUPERFLEX® 300 (ether/ester-based, weak anionic type), SUPERFLEX® 420 (polycarbonate-based/anionic type), and SUPERFLEX® 460 (polycarbonate-based/anionic type) (all manufactured by DKS Co. Ltd.).

(General)

The average particle dimeter of the first resin can be, for example, 80 to 400 nm, preferably 150 to 300 nm. The average particle diameter of the first resin can be measured by the same method as the average particle diameter of the pigment particles.

The content of the first resin in the ink is preferably 1 to 20% by mass or more, preferably 5 to 15% by mass, with respect to the ink. When the content of the first resin is equal to or more than the lower limit value, it is easy to further increase the fixability of the ink to the fabric. When the content of the first resin is equal to or less than the upper limit value, the fabric does not become excessively hard, and the texture of the fabric is less likely to be impaired. The first resin may be one type or may be two or more types.

8

1-1-3. Water-Soluble Organic Solvent

The water-soluble organic solvent is not particularly limited as long as it is compatible with water, but it is preferable to contain a polyhydric alcohol from the viewpoint of easy adjustment of permeability into a fabric and viscosity.

Examples of the polyhydric alcohols include divalent alcohols such as ethylene glycol (boiling point: 197° C.), propylene glycol (boiling point: 188° C.), 1,3-butanediol (boiling point: 208° C.), 1,5-pentanediol (boiling point: 242° C.), 1,6-hexanediol (boiling point: 223° C.), and dipropylene glycol (boiling point: 230.5° C.), and polypropylene glycol; and alcohols having 3 or more valences such as hexanetriol, glycerin (boiling point: 290° C.), and trimethylolpropane (boiling point: 295° C.). Among these, from the viewpoint of making it easier to adjust the viscosity while further increasing the moisture-retaining property of the ink, the polyhydric alcohol is preferably a polyhydric alcohol having a boiling point of 180° C. or more.

The water-soluble organic solvent may further include another solvent other than those described above. Examples of other solvents include polyhydric alcohol ethers (for example, ethylene glycol monomethyl ether, ethylene glycol monobutyl ether, diethylene glycol monomethyl ether, diethylene glycol dimethyl ether, propylene glycol monomethyl ether, propylene glycol monoethyl ether: ethers of divalent alcohols such as triethylene glycol monomethyl ether, tetraethylene glycol monomethyl ether, tripropylene glycol monoethyl ether, and polypropylene glycol: ethers of alcohols having 3 or more valences such as glycerin and hexanetriol);

monovalent alcohols (for example, methanol, ethanol, propanol, pentanol, hexanol, cyclohexanol, and benzyl alcohol);

amines (for example, ethanolamine, N-ethyldiethanolamine, morpholine, N-ethylmorpholine, ethylenediamine, diethylenediamine, and triethylenetetramine);

amides (for example, formamide, N,N-dimethylformamide, and N,N-dimethylacetamide);

heterocycles (for example, 2-pyrrolidone, N-methyl-2-pyrrolidone, N-cyclohexyl-2-pyrrolidone, 2-oxazolidone, and 1,3-dimethyl-2-imidazolidine), and sulfoxides (for example, dimethylsulfoxide); and sulfones (for example, sulfolane).

The content of the polyhydric alcohol in the ink is preferably more than the content of the polyhydric alcohol in the first treatment liquid. For example, the content of the polyhydric alcohols in the ink is preferably 5 to 50% by mass, more preferably 15 to 40% by mass. When the content of the polyhydric alcohol is 5% by mass or more, the viscosity of the ink is easily increased with respect to the first treatment liquid. When the content of the polyhydric alcohol is 50% by mass or less, since the viscosity of the ink is not too high, for example, ejection property by ink jet is less likely to be impaired.

The content of the water is from 30 to 90% by mass, preferably from 50 to 75% by mass with respect to the ink.

1-1-4. Other Components

The ink may further contain other components as necessary. Examples of other components include pigment dispersants, surfactants, preservatives, antibacterial agents, and pH adjusters.

(Pigment Dispersant)

The pigment dispersant is present in the ink so as to surround the surface of the pigment particles or is adsorbed onto the surface of the pigment particles to form a pigment dispersion, thereby satisfactorily dispersing the pigment. Such a pigment dispersant is preferably a polymer dispersant from the viewpoint of excellent dispersibility of the pigment. Examples of the polymer dispersant include anionic dispersants and cationic dispersants, and anionic dispersants are preferable.

The anionic dispersant may be a polymer dispersant having an anionic group. The anionic group is the same as defined above. Among them, a polymer dispersant having a carboxylic acid group is preferable.

The anionic group equivalent of the anionic dispersant is not particularly limited as long as it can sufficiently disperse the pigment particles, but for example, it is preferably in a range of 1.1 to 3.8 meq/g. When the anionic group equivalent is within the above range, high pigment dispersibility is easily obtained even when the molecular weight of the anionic dispersant is not large. The anionic group equivalent can be measured by the same method as the method for measuring the acid value.

The content of the polymer dispersant may be in a range where the pigment particles can be sufficiently dispersed and the viscosity can be adjusted to an extent that does not impair the permeability into fabric, and is, for example, 20 to 100% by mass, preferably 25 to 60% by mass, relative to the pigment.

(Surfactant)

The surfactant can decrease the surface tension of the ink and increase the wettability with respect to the fabric. The type of the surfactant is not particularly limited, and examples thereof include acetylene glycol-based surfactants, silicone-based surfactants, and fluorine-based surfactants.

(Preservative and Antibacterial Agent)

Examples of the preservative or the antibacterial agent include aromatic halogen compounds (for example, Preventol CMK), methylene dithiocyanate, halogen-containing nitrogen-sulfur compounds, and 1,2-benzisothiazolin-3-one (for example, PROXEL GXL).

(pH Adjuster)

Examples of the pH adjuster include citric acid, sodium citrate, hydrochloric acid, and sodium hydroxide.

1-1-5. Physical Properties

The viscosity of the ink at 25° C. is higher than the viscosity of the first treatment liquid at 25° C. This is because the permeability of the ink in the depth direction of the fabric becomes less likely to be higher than that of the first treatment liquid, and the amount of ink that permeates without being aggregated by the first treatment liquid can be reduced. Further, the viscosity of the ink at 25° C. is preferably higher than the viscosity of the second treatment liquid at 25° C.

The viscosity of the ink at 25° C. is not particularly limited as long as the ejection property by an ink jet method is satisfactory, but is preferably 3 to 15 mPa·s, more preferably 4 to 12 mPa·s. The viscosity of the ink can be measured by an E-type viscometer at 25° C.

The viscosity of the ink can be adjusted by, for example, the composition of the solvent and the content of the first resin. For example, when the content of the polyhydric alcohol or the content of the first resin is increased, the viscosity of the ink tends to be increased.

1-2. First Treatment Liquid

The first treatment liquid according to the present embodiment includes a second resin, a water-soluble organic solvent, and water.

1-2-1. Second Resin

As described above, the second resin reacts or interacts with the first resin contained in the ink to aggregate. That is, the second resin has an ionic group that forms a pair with the ionic group of the first resin, and may have a cationic group or an anionic group. Since the first resin contained in the ink preferably contains a resin having an anionic group, the second resin contained in the first treatment liquid preferably contains a resin having a cationic group. Examples of the cationic group contained in the second resin include secondary amino group (imino group), tertiary amino group, and quaternary ammonium base.

Examples of the second resin includes (meth)acrylic resin having a cationic group.

The (meth)acrylic resin having a cationic group can be a polymer having a structural unit derived from a (meth)acryl-based monomer having a cationic group. Examples of the (meth)acryl-based monomer having a cationic group include (meth)acrylate having a cationic group and (meth) acrylamide having a cationic group.

Examples of the acrylic resin having a cationic group include cationized poly (meth)acrylate, cationized poly (meth)acrylamide, a cationized (meth)acrylate-acrylamide copolymer, and cationized methacrylate-methacrylate copolymers. Examples of commercially available products include RKW series manufactured by Taisei Fine Chemical Co., Ltd, and VINYBRAN 1008, 1028 and 2687 manufactured by Nissin Chemical Industry Co., Ltd. (cationized polyacrylates): SUMIFLOC FC-A and SUMIFLOC FC-B manufactured by Sumitomo Chemical Industry Company Limited (cationized polymethacrylates): SUNFLOC C-450 and SUNFLOC C-454 manufactured by Sanyo Chemical Industries, Ltd., SUMIFLOC FC-L manufactured by Sumitomo Chemical Industry Company Limited, and Hymolock MP series, E series, and M-966 manufactured by HYMO Co., Ltd (cationized polyacrylamides), SUMIFLOC FC-373, SUMIFLOC FC-200, and SUMIFLOC FC-C manufactured by Sumitomo Chemical Industry Company Limited (cationized methacrylate-acrylamide copolymers), and SUMIFLOC FC-E manufactured by Sumitomo Chemical Industry Company Limited (cationized methacrylate-methacrylate copolymers). As the second resin, the same resin as the cationic resin in the below-escribed second treatment liquid may be used.

The type of the second resin contained in the first treatment liquid may be the same as the first resin contained in the ink as long as the ion species of the second resin is opposite to that of the first resin, or different from the first resin.

From the viewpoint of further improving the friction fastness without impairing the texture, it is preferable that the Tg of the second resin contained in the first treatment liquid is equal to or higher than the Tg of the first resin contained in the ink. In particular, when the first treatment liquid or the ink contains a solvent having a high boiling point, from the viewpoint of improving drying properties, it is desirable that the ink is not easily become sticky even when dried at a high temperature. From such a viewpoint, the difference between the Tg of the second resin contained in the first treatment liquid and the Tg of the first resin contained in the ink can be set to be, for example, 10° C. or more. The Tg of the second resin contained in the first treatment liquid can be preferably 0° C. to 100° C.

For example, in the (meth)acrylic resin, it is preferable that the (meth)acrylic monomer contains methacrylic acid, acrylic acid, or a methacrylic acid alkyl ester, from the viewpoint of increasing Tg.

The range of the average particle dimeter of the second resin can be the same as the range of the average dimeter of the first resin contained in the ink.

It is preferable that the content of the second resin in the first treatment liquid is less than the content of the first resin in the ink. This configuration not only allows the viscosity of the first treatment liquid to be lower than the viscosity of the ink, but also allows the second resin to efficiently react with the first resin and prevents the second resin to be present on the fabric more than necessary, thereby favorably maintaining the texture. To be specific, when the content of the first resin in the ink is M1 and the content of the second resin in the first treatment liquid is M2, M2/M1 is preferably 0.1 to 0.7 (mass ratio). When M2/M1 is 0.7 or less, the texture is more easily improved. When M2/M1 is 0.1 or greater, the friction fastness is more easily improved.

The content of the second resin in the first treatment liquid is, for example, 1 to 20% by mass and preferably 3% to 8% by mass with respect to the first treatment liquid. When the content of the second resin is 1% by mass or more, the friction fastness is further easily improved. When the content of the second resin is 20% by mass or less, the surface of the image-formed product does not become too hard, and therefore, friction can be further reduced.

1-2-2. Water-Soluble Organic Solvent

The water-soluble organic solvent contained in the first treatment liquid may be the same as the water-soluble organic solvent contained in the ink. That is, it is preferable that the water-soluble organic solvent contained in the first treatment liquid contains the above-described polyhydric alcohol.

The content of the polyhydric alcohol in the first treatment liquid is preferably less than the content of the polyhydric alcohol in the ink. This is because the viscosity of the first treatment liquid is more likely to become lower than the viscosity of the ink, the permeability of the first treatment liquid in the depth direction of the fabric becomes higher than that of the ink, and the first resin in the ink and the second resin in the first treatment liquid easily come into sufficient contact with each other.

For example, the content of the polyhydric alcohols in the first treatment liquid is preferably 5 to 50% by mass, more preferably 13 to 40% by mass. When the content of the polyhydric alcohol is 5% by mass or more, the viscosity of the first treatment liquid tends to increase, and thus the first treatment liquid easily comes into sufficient contact with the aggregating agent in the first treatment liquid. When the content of the polyhydric alcohol is 50% by mass or less, the viscosity of the first treatment liquid is not too high, and thus, for example, the ejection property by spraying or ink jetting is less likely to be impaired.

Among these, it is preferable that the average value of the viscosity/surface tension ratio of the water-soluble organic solvent contained in the first treatment liquid is larger than that of the water-soluble organic solvent contained in the ink. The first treatment liquid has a lower viscosity than the ink, but when the viscosity is too low, it is difficult to form uniform liquid droplets when ejection is performed by an inkjet method, thereby causing malfunction such as image defects. On the other hand, since the first treatment liquid containing a water-soluble organic solvent having a large value of viscosity/surface tension has a low surface tension and an appropriate viscosity, the first treatment liquid is less likely to impair the ejection property in the ink jet method while maintaining the permeability into the fabric.

The difference between the average value of the viscosity/surface tension ratio of the water-soluble organic solvent in the first treatment liquid and the average value of the viscosity/surface tension ratio of the water-soluble organic solvent in the ink can be, for example, 1 or more.

The viscosity in the viscosity/surface tension ratio is a viscosity measured at 25° C. by an E-type viscometer (manufactured by Toki Sangyo Co., Ltd), and the surface tension is a surface tension measured at 25° C. by a surface tensiometer (manufactured by Kyowa Interface Science Co., Ltd). Further, when the first treatment liquid contains a solvent A and a solvent B as water-soluble organic solvents, the average value of the viscosity/surface tension ratios of the water-soluble organic solvents contained in the first treatment liquid is obtained as $a*m1/100+b*m2/100$, where a is defined as the viscosity/surface tension ratio of the solvent A, m1 (% by mass) is defined as the mass fraction of the solvent A in the total organic solvents contained in the first treatment liquid, b is defined as the viscosity/surface tension ratio of the solvent B, and m2 (% by mass) is defined as the mass fraction of the solvent B in the total organic solvents contained in the first treatment liquid.

The average value of the viscosity/surface tension ratio of the water-soluble organic solvent in each liquid can be adjusted by the composition of the water-soluble organic solvent. For example, as the first treatment liquid contains a large amount of a solvent having a large viscosity/surface tension ratio, the average value of the viscosity/surface tension ratio of the water-soluble organic solvent of the first treatment liquid also increases. The viscosity/surface tension ratio of the polyhydric alcohol contained at the largest amount in the first treatment liquid is preferably 2 to 15. Examples of the polyhydric alcohol having a large viscosity/surface tension ratio include 1,5-pentanediol, dipropylene glycol (DPG), 1,3-butanediol, and glycerin.

The content of water is from 30 to 90% by mass, preferably from 50 to 83% by mass, with respect to the first treatment liquid.

1-2-3. Other Components

The first treatment liquid may further contain a pH adjuster, a preservative, and the like as necessary. The pH adjuster and the preservative may be the same as those contained in the ink described below.

1-2-4. Physical Properties

The viscosity of the first treatment liquid at 25° C. is lower than the viscosity of the ink at 25° C. As a result, the permeability of the first treatment liquid in the depth direction of the fabric is higher than that of the ink, and thus the ratio of the ink that permeates the fabric without interacting with the second resin in the first treatment liquid can be reduced. To be specific, the viscosity of the first treatment liquid at 25° C. is preferably 4 to 10 mPa·s.

The difference between the viscosities of the first treatment liquid and the ink at 25° C. is not particularly limited, but is preferably 2 to 5 mPa·s, more preferably 2 to 4 mPa·s. When the viscosity difference is 2 mPa's or more, the ejection property of the first treatment liquid is further less likely to be impaired. When the viscosity difference is 5 mPa's or less, the permeability of the first treatment liquid into the fabric is not too high, and thus the ratio of the first treatment liquid that does not come into contact with the ink can be further reduced.

The viscosity of the first treatment liquid can be adjusted by the composition of the water-soluble organic solvent (particularly, the content of the polyhydric alcohol) or the amount of the second resin. For example, when the content of the polyhydric alcohol is reduced, the viscosity of the first treatment liquid is likely to be reduced. In particular, among the polyhydric alcohols, a polyhydric alcohol having a boiling point of 180° C. or higher, preferably 200° C. or higher, has a high viscosity, and therefore, when the amount of such a polyhydric alcohol is reduced, the viscosity of the first treatment liquid tends to become low. In addition, when the amount of the second resin is reduced, the viscosity of the first treatment liquid is also likely to be reduced.

1-3. Second Treatment Liquid (Pretreatment Liquid)

The second treatment liquid contains an aggregating agent, a water-soluble organic solvent, and water.

1-3-1. Aggregating Agent

An aggregating agent aggregates the pigment, the dispersant, and the first resin contained in the ink. Accordingly, the ink is easily thickened on the fabric, and these components contained in the ink are easily held in the vicinity of the surface layer of the fabric. The mechanism for aggregating or precipitating the pigment or the polymer is not particularly limited, but is preferably an electrical action (reaction between an anionic group and a cationic group).

The type of the aggregating agent may be a substance having a cationic group (cationic substance) or a substance having an anionic group (anionic substance) depending on the type of the resin contained in the ink or the first treatment liquid. In particular, the aggregating agent preferably contains a cationic substance.

Examples of the cationic substance include polyvalent metal salts, organic acids, cationic surfactants, and cationic resins.

The polyvalent metal salt may be a water-soluble compound having a divalent or more polyvalent metal ion and an anion bonded thereto. Examples of polyvalent metal ion include divalent metal ions such as $Ca^{2+}$, $Cu^{2+}$, $Ni^{2+}$, $Mg^{2+}$, $Zn^{2+}$, $Ba^{2+}$ and trivalent metal ions such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Among these, a calcium salt and a magnesium salt are preferable, and calcium nitrate and calcium chloride are preferable.

The organic acid may be a carboxylic acid having 1 to 6 carbon atoms. Examples of the organic acid include acetic acid, propionic acid, pantothenic acid, ascorbic acid, citric acid, malic acid, lactic acid, tartaric acid, succinic acid, and gluconic acid.

Examples of the cationic resin include cationic urethane resin, cationic olefin resin, and cationic polyamine resin.

The cationic urethane resin may be a commercially available product, and for example, HYDRAN CP-7010, CP-7020, CP-7030, CP-7040, CP-7050, CP-7060 or CP-7610 (trade names, manufactured by DIC Corporation); SUPERFLEX 600, 610, 620, 630, 640, or 650 (trade names, manufactured by DKS Co., Ltd.); urethane emulsions WBR-2120C or WBR-2122C (trade names, manufactured by Taisei Fine Chemical Co., Ltd) or the like can be used.

The cationic olefin resin is a resin having an olefin such as ethylene or propylene in a structural skeleton thereof, and a known resin can be used. As the cationic olefin resin, a commercially available product can be used, and examples thereof include ARROWBASE CB-1200 and CD-1200 (trade names, manufactured by Unitika Ltd).

Examples of polyamine resins having a cationic group include dicyane-based cationic resin represented by guanidine-based condensed polyamine, dicyandiamide formalin condensate, acrylamide-diallylamine salt copolymer, acrylic polymer having secondary amino group, tertiary amino group or quaternary ammonium group, polyvinylamine, polyvinylamidine, 5-membered ring amidines, and dicyandiamide-formalin copolymers, dicyanide cationic resin represented by dicyandiamide-formalin copolymer, polyamine-based cationic resin represented by dicyandiamide-polyethyleneamine copolymer, polyalkylene polyamines such as polyethylene polyamine and polypropylene polyamine or derivatives thereof, diallyldimethylammonium-$SO_2$ copolymer, diallylamine salt-$SO_2$ copolymer, diallyldimethylammonium chloride polymer, polymer of allylamine salt, homopolymer or copolymer of vinylbenzyl-triallyl ammonium salt, and copolymer of dialkylaminoethyl (meth)acrylate quaternary salt. Among these, an alkylamine epichlorohydrin condensate, a polyethylenimine-epichloro-hydrin condensate, and the like are exemplified.

The cationic resin in the second treatment liquid may be the same as or different from the cationic resin as the second resin in the first treatment liquid. For example, when the second treatment liquid is used as the pretreatment liquid, the Tg of the cationic resin in the second treatment liquid is preferably lower than the Tg of the cationic resin in the first treatment liquid from the viewpoint of more easily maintaining the texture of the fabric in a more favorable manner. In the present embodiment, the cationic resin contained in the second treatment liquid is preferably different from the second resin contained in the first treatment liquid, and is more preferably a cationic polyamine resin.

The content of the aggregating agent in the second treatment liquid is not particularly limited, but can be 0.5 to 10% by mass with respect to the second treatment liquid.

1-3-2. Water-Soluble Organic Solvent

The water-soluble organic solvent contained in the second treatment liquid may be the same as the water-soluble organic solvent contained in the ink. That is, it is preferable that the water-soluble organic solvent in the second treatment liquid contains the above-escribed polyhydric alcohol.

The content of the polyhydric alcohol in the second treatment liquid is preferably less than the content of the polyhydric alcohol in the ink or the first treatment liquid. For example, the content of the polyhydric alcohol in the second treatment liquid is preferably 5 to 50% by mass, more preferably 15 to 40% by mass. When the content of the polyhydric alcohol is 5% by mass or more, the viscosity of the second treatment liquid is not too low, and thus the second treatment liquid easily comes into sufficient contact with the ink or the resin in the second treatment liquid. When the content of the polyhydric alcohol is 50% by mass or less, the viscosity of the first treatment liquid is not too high, and thus the ejection property by spraying or ink jetting is less likely to be impaired.

In particular, the average value of the viscosity/surface tension ratio of the water-soluble organic solvent contained in the second treatment liquid is preferably larger than that of the water-soluble organic solvent contained in the ink or the first treatment liquid. Since such a second treatment liquid has a low surface tension and an appropriate viscosity, it is easy to form uniform liquid droplets when ejection is performed by an inkjet method. Therefore, the ejection property of the second treatment liquid in the inkjet method can be further less likely to be impaired while maintaining the permeability into the fabric.

The difference between the average value of the viscosity/surface tension ratio of the water-soluble organic solvent contained in the second treatment liquid and the average value of the viscosity/surface tension ratio of the water-soluble organic solvent contained in the ink can be, for example, 1 or more.

The total amount of the water-soluble organic solvent is from 5 to 60% by mass, preferably from 10 to 40% by mass, with respect to the second treatment liquid.

The content of water is 30 to 80% by mass, and preferably 50 to 80% by mass with respect to the second treatment liquid.

The second treatment liquid may further contain a pH adjuster, a preservative, and the like, as necessary. The pH adjuster and the preservative may be the same as those contained in the ink.

1-3-3. Physical Properties

The viscosity of the second treatment liquid at 25° C. is preferably lower than the viscosity of the ink at 25° C. This is because since the permeability of the second treatment liquid in the depth direction of the fabric is higher than the viscosity of the ink or the second treatment liquid, the ratio of the ink that permeates without being aggregated by the aggregating agent in the second treatment liquid can be further reduced, and the color density and texture can be further improved.

The viscosity of the second treatment liquid at 25° C. is more preferably lower than the viscosity of the first treatment liquid at 25° C. When the viscosity of the second treatment liquid is further decreased, the aggregating agent contained in the second treatment liquid can be more easily permeated into the inside of the fabric. As a result, the first resin contained in the ink is more likely to interact or react with the aggregating agent in the second treatment liquid, and the first resin and the pigment in the ink are more likely to aggregate in the vicinity of the surface layer of the fabric. Therefore, the color density and the texture can be further improved. Specifically, the viscosity of the first treatment liquid at 25° C. is preferably 4 to 8 mPa·s.

In the same manner as the first treatment liquid, the viscosity of the second treatment liquid can be adjusted by the composition of the water-soluble organic solvent (particularly, the content of the polyhydric alcohol). For example, when the content of the polyhydric alcohol is reduced, the viscosity of the first treatment liquid is likely to be reduced.

The first treatment liquid, the ink, and the second treatment liquid can be used as an ink set.

Next, an image forming method using the first treatment liquid, the ink, and the second treatment liquid will be described.

2. Image Forming Method

The image forming method according to an embodiment of the present invention includes a step of applying the ink and the first treatment liquid onto a fabric in a wet-on-wet manner to each other. As a result, the components in the ink and the components in the first treatment liquid are easily flow and mixed. Therefore, the first resin in the ink and the second resin in the first treatment liquid may react with each other or interact with each other to be easily aggregated.

Applying in a wet-on-wet manner means, as described above, applying a subsequent liquid before most of a liquid having been applied to the fabric is completely dried. That is, it means that while the residual liquid amount of a previously applied liquid (e.g., ink) is 10% by mass or more, preferably from 60 to 100% by mass, per unit area of the recording region, a subsequently applied liquid (e.g., the first treatment liquid) is applied. The residual liquid amount is an amount at a surface temperature of the fabric of 40° C. or less, preferably from 30 to 40° C. The amount of the residual liquid can be adjusted by, for example, the time (application interval) from the application of the previously applied liquid to the application of the subsequently applied liquid.

A fabric to which a aggregating agent for aggregating the first resin is attached in advance may be used as the fabric, or a second treatment liquid containing a aggregating agent may be further applied. In the present embodiment, it is preferable that the second treatment liquid is further applied in the step of applying by the wet-on-wet manner. It is more preferable that the second treatment liquid is applied in a wet-on-wet manner with the ink.

The order of applying the respective liquids is not particularly limited, and the liquids may be applied in the order of the second treatment liquid, the ink, and the first treatment liquid: or the liquids may be applied in the order of the first treatment liquid, the ink, and the second treatment liquid. In particular, from the viewpoint of causing the first resin contained in the ink to easily react or interact with the second resin contained in the first treatment liquid, it is preferable that the second treatment liquid, the ink, and the first treatment liquid are applied in this order. In this case, the second treatment liquid can function as a pretreatment liquid, and the first treatment liquid can function as a post-treatment liquid.

That is, it is preferable that the step of applying in a wet-on-wet manner includes a step of applying the second treatment liquid onto the fabric, a step of applying the ink in a wet-on-wet manner onto the fabric to which the second treatment liquid has been applied, and a step of applying the first treatment liquid in a wet-on-wet manner onto the fabric to which the ink has been applied, in this order.

2-1. Step of Applying Second Treatment Liquid

First, the second treatment liquid is applied to the fabric to attach the aggregating agent.

The fiber forming the fabric is not particularly limited, and examples thereof include natural fibers such as cotton (cellulose fiber), hemp, wool, and silk: chemical fibers such as rayon, vinylon, nylon, acrylic, polyurethane, polyester, and acetate; and blended fibers thereof. Among these, the resin forming the fabric may be a hydrophilic fiber such as cotton, a hydrophobic fiber such as polyester, or a blended fiber thereof. In addition, the fabric may be in any form of these fibers, such as a woven fabric, a nonwoven fabric, or a knitted fabric. The fabric may be a mixed woven fabric or a mixed nonwoven fabric of two or more types of fibers.

The method for applying the second treatment liquid is preferably a spray method or an inkjet method from the viewpoint of enabling wet-on-wet application.

The adhesion amount of the second treatment liquid is not particularly limited, but may be, for example, 5 to 70 g/m², more preferably 20 to 60 g/m².

2-2. Step of Applying Ink

Subsequently, the ink is applied onto the fabric, to which the second treatment liquid has been applied in the wet-on-wet manner, by an ink jet method. Thus, the pigment and the first resin in the ink are aggregated on the fabric.

2-3. Step of Applying First Treatment Liquid

Next, the first treatment liquid is applied in a wet-on-wet manner onto the fabric, on which the ink has been applied. Specifically, the first treatment liquid is applied in a wet-on-wet manner before the ink applied to the fabric is completely dried. As a result, on the fabric, the second resin contained in the first treatment liquid can be easily mixed with the first resin, the pigment, or the like contained in the ink, and the second resin can be easily aggregated.

The method of applying the first treatment liquid may be the same as the method of applying the second treatment liquid.

The adhesion amount of the first treatment liquid is not particularly limited, but is preferably 1 to 120 g/m², more preferably 10 to 60 g/m². When the adhesion amount of the second treatment liquid is within the above range, the friction fastness can be further improved without impairing the texture of the fabric.

2-4. Application Interval

When the surface temperature of the fabric is 40° C. or less, preferably 30 to 40° C., the application interval between the second treatment liquid and the ink and the application interval between the ink and the first treatment liquid can each be 5 seconds or less, preferably 3 seconds or less. When the application interval is 5 seconds or less, the subsequently applied liquid (for example, the first treatment liquid) is easily applied while the viscosity of the previously applied liquid (for example, the ink) is not increased by drying. Therefore, both liquids are easily mixed in a wet state. The lower limit value of the application interval may be, for example, 0.1 seconds or more.

2-5. Other Steps

The image forming method may further include other steps as necessary. For example, a drying step may be further performed after the step of applying the first treatment liquid.

In the drying step, the solvent and the like contained in each liquid applied to the fabric are removed and the fabric is dried. The drying method is not particularly limited, and the drying may be performed at room temperature or may be performed by heating. The heating method may be a method using a heater, a warm air dryer, a heating roller, or the like, and is preferably a method of heating from both surfaces of the fabric using a warm air dryer and a heater.

The drying temperature is not particularly limited, but may be, for example, 80° C. to 180° C. since an ink containing a relatively large amount of polyhydric alcohols or the first treatment liquid is used. The drying time depends on the drying temperature, but may be, for example, 1 to 10 minutes.

2-6. Effects

Hereinafter, the effects of the image forming method will be described. First, the outline of an image forming apparatus used in the image forming method will be described, and then the effects thereof will be described.

FIG. 1A is a schematic diagram illustrating an outline of an image forming apparatus used in the image forming method described above, and FIG. 1B is a schematic diagram illustrating an image of a permeation state inside of a fabric when each liquid is applied with the image forming apparatus of FIG. 1A.

The image forming apparatus 100 includes, from the upstream side along the conveyance direction of the fabric 130 (the direction of arrow X in the drawing), a head carriage 110 on which a plurality of inkjet recording heads are mounted, and a drying unit 120.

The head carriage 110 includes, for example, an inkjet recording head 111 that discharges the second treatment liquid, an inkjet recording head 112 that discharges ink, and an inkjet recording head 113 that discharges the first treatment liquid.

The drying unit 120 can be a known dryer such as a hot air dryer that blows hot air or an irradiator that emits infrared rays or ionizing radiation.

In the image forming apparatus 100, a fabric 130 is conveyed to a position below the head carriage 110. Next, droplets of the second treatment liquid are discharged from the inkjet recording head 111 mounted on the head carriage 110 to apply the second treatment liquid onto the fabric 130. Next, ink droplets are discharged from the inkjet recording head 112 to apply the ink. Next, liquid droplets of the first treatment liquid are discharged from the ink jet recording head 113 to apply the first treatment liquid. Thereafter, the drying unit 120 dries the image formed on the fabric 130 by, for example, blowing temperature-controlled air.

Figure 1B:
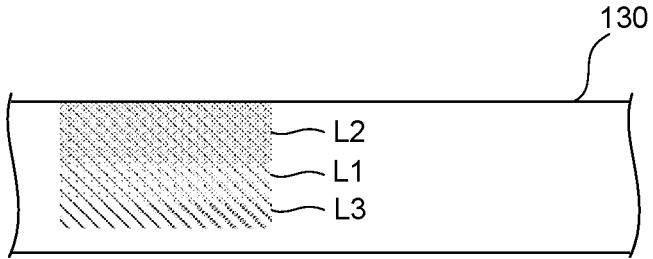

In the image forming method according to the present embodiment, each liquid is applied in a wet-on-wet manner to each other. Further, the viscosity of the first treatment liquid L1 at 25° C. is lower than the viscosity of the ink L2 at 25° C. Further, it is preferable that the viscosity of the second treatment liquid L3 at 25° C. is lower than the viscosity of the first treatment liquid L1 at 25° C. Accordingly, a permeation state as illustrated in FIG. 1B can be obtained.

That is, when the viscosity of the first treatment liquid L1 is higher than the viscosity of the ink L2, the ink L2 more easily permeates the fabric in the depth direction than the first treatment liquid L1. Accordingly, the amount of the ink L1 that is not aggregated by the first treatment liquid L2 increases, thereby decreasing the quality.

On the other hand, the viscosity of the first treatment liquid L1 is made lower than the viscosity of the ink L2. As a result, the permeation of the ink L2 in the depth direction of the fabric is suppressed to a suitable degree compared to the permeation of the first treatment liquid L1 in the depth direction of the fabric, and therefore the amount of ink L1 that passes through without contacting the second resins contained in the first treatment liquid L2 can be reduced. Thus, the components in the ink L2 can be sufficiently aggregated by the first treatment liquid L1, and therefore, an image-formed product having high friction fastness can be obtained.

Furthermore, by making the viscosity of the second treatment liquid L3 lower than the viscosity of the first treatment liquid L1, the components in the ink L2 can be further aggregated by the second treatment liquid L3 as well.

EXAMPLE

Hereinafter, the present invention will be specifically described with reference to Examples: however, the present invention is not limited thereto.

1. Materials 1-1. Pigment

<Preparation of Pigment-Dispersed Liquid>

A neutralized product of the pigment dispersant was prepared by mixing 78 parts by mass of water with 7 parts by mass of a styrene-butyl acrylate-methacrylic acid copolymer (anionic dispersant, weight-average molecular weight: 16000, anionic group equivalent: 3.5 meq/g) as a pigment dispersant, and heating and stirring the mixture. To this mixture, 15 parts by weight of C. I. Pigments Blue 15:3 was added and premixed, the mixture was dispersed using a sand grinder filled with 50% by volume fraction of 0.5 mm zirconia beads to obtain a cyan pigment-dispersed liquid having a pigment-concentration of 15% by mass.

1-2. Aggregating Agent

Quaternary salt of alkylamine epichlorohydrin adduct (cationic substance)

1-3. Resin

Water-dispersible resin 1 (first resin): TAKELAC W-6061 (manufactured by Mitsui Chemicals, Inc., polyurethane resin particles, Tg:25° C.)

Water-dispersible resin 2 (second resin): VINYBRAN 2687 (manufactured by Nissin Chemical Industry Co., Ltd., cationized polyacrylate, Tg:20° C.)

Water-dispersible resin 3 (second resin): TAKELAC W-635 (manufactured by Mitsui Chemicals, Inc., nonionic polyurethane, Tg:70° C.)

1-4. Water-Soluble Organic Solvent

Ethylene glycol (boiling point 197° C., viscosity/surface tension=0.41)

Glycerin (boiling point 290° C., viscosity/surface tension=15.0)

Propylene glycol (boiling point 188° C., viscosity/surface tension=1.38)

1,5-Pentanediol (boiling point 242° C., viscosity/surface tension=2.79)

Dipropylene glycol (boiling point 230.5° C., viscosity/surface tension=3.12)

<Preparation of First Treatment Liquids (Post-Treatment Liquids) A to H>

The components were mixed at formulation ratios shown in Table 2 to give a total of 100 parts by mass, thereby preparing first treatment liquids A to H. Each unit of the numerical value of each component in the table is "parts by mass."

TABLE 2

| | | First treatment liquid A | First treatment liquid B | First treatment liquid C | First treatment liquid D | First treatment liquid E | First treatment liquid F | First treatment liquid G | First treatment liquid H |
|---|---|---|---|---|---|---|---|---|---|
| Second resin | Water-dispersible resin 2 | 5 | 5 | 5 | 3 | 5 | 5 | 10 | 0 |
| | Water-dispersible resin 3 | 0 | 0 | 0 | 0 | 0 | 0 | 0 | 5 (nonionic) |
| Organic solvent | Ethylene glycol | 8 | 8 | 8 | 8 | 0 | 0 | 8 | 8 |
| | Glycerin | 0 | 5 | 10 | 10 | 10 | 10 | 10 | 5 |
| | Propylene glycol | 5 | 5 | 5 | 5 | 0 | 0 | 5 | 5 |
| | 1,5 Pentanediol | 0 | 0 | 0 | 0 | 13 | 0 | 0 | 0 |
| | DPG | 0 | 0 | 0 | 0 | 0 | 13 | 0 | 0 |
| Surfactant | | 0.1 | 0.1 | 0.1 | 0.1 | 0.1 | 0.1 | 0.1 | 0.1 |
| Preservative | | 0.1 | 0.1 | 0.1 | 0.1 | 0.1 | 0.1 | 0.1 | 0.1 |
| Ion exchange water | | 81.8 | 76.8 | 71.8 | 73.8 | 71.8 | 71.8 | 66.8 | 81.8 |
| Viscosity/surface tension of organic solvent* | | 0.79 | 4.74 | 6.97 | 6.97 | 8.10 | 8.29 | 6.97 | 4.74 |
| Viscosity (mPa · s) | | 4.5 | 6 | 8 | 7 | 6 | 6 | 8 | 6 |

*Average value of viscosity/surface tension of organic solvent

The surface tension was measured with a surface tensiometer at 25° C., the viscosity was measured with an E-type viscometer at 25° C., and the viscosity/surface tension ratio was calculated from these values.

1-5. Other Components

OLFINE E1010 (manufactured by Nissin Chemical Industry Co., Ltd., acetylene glycol-based surfactant)

PROXEL GXL (manufactured by Lonza K.K., 1,2-benzisothiazolin-3-one, antibacterial agent)

2 Preparation of Ink, First Treatment Liquid, and Second Treatment Liquid

<Preparation of Inks A to D>

The components were mixed at the formulation ratios shown in Table 1 to give a total of 100 parts by mass, thereby preparing each of inks A to D. Each unit of the numerical value of each component in the table is "parts by mass."

TABLE 1

| | | Ink A | Ink B | Ink C | Ink D |
|---|---|---|---|---|---|
| Pigment dispersion | | 3 | 3 | 3 | 5 |
| First resin | Water-dispersible resin 1 | 8 | 8 | 8 | 10 |
| Organic solvent | Ethylene glycol | 10 | 10 | 10 | 10 |
| | Glycerin | 10 | 20 | 25 | 10 |
| | Propylene glycol | 5 | 5 | 5 | 5 |
| Surfactant | | 0.1 | 0.1 | 0.1 | 0.1 |
| Preservative | | 0.1 | 0.1 | 0.1 | 0.1 |
| Ion-exchanged water | | 63.8 | 53.8 | 48.8 | 59.8 |
| Viscosity/surface tension of organic solvent * | | 6.44 | 8.89 | 9.65 | 6.44 |
| Viscosity (mPa · s) | | 8 | 10 | 12 | 10 |

* Average value of viscosity/surface tension of organic solvent

<Preparation of Second Treatment liquids (Pretreatment Liquids) A and B>

The respective components were mixed at formulation ratios shown in Table 3 to give a total of 100 parts by mass, thereby preparing second treatment liquids A and B. Each unit of the numerical value of each component in the table is "parts by mass."

TABLE 3

| | | Second treatment liquid A | Second treatment liquid B |
|---|---|---|---|
| Aggregating agent | | 5 | 5 |
| Organic solvent | Ethylene glycol | 10 | 10 |
| | Glycerin | 0 | 10 |
| | Propylene glycol | 5 | 5 |
| Surfactant | | 0.1 | 0.1 |
| Preservative | | 0.1 | 0.1 |
| Ion-exchanged water | | 79.8 | 69.8 |
| Viscosity/surface tension of organic solvent * | | 0.74 | 6.44 |
| Viscosity (mPa · s) | | 4 | 8 |

* Average value of viscosity/surface tension of organic solvent

The viscosity of each liquid was measured by an E-type viscometer at 25° C.

3. Image Forming Test and Evaluation

Example 1

(Image Forming Test)

Cotton fabric (cotton broad 40) was prepared as a fabric. Next, an image forming test was performed using the second treatment liquid (pretreatment liquid), the ink, and the first treatment liquid (post-treatment liquid) described in Table 4 prepared above.

First, a modified Nasennger 8 was prepared as an image forming apparatus. The image forming apparatus includes an inkjet head (Konica Minolta Head #204) and a spray head. The inkjet head includes a second treatment liquid head, an ink head, and a first treatment liquid head. Then, the ink and the first treatment liquid described in Table 4 were set in the inkjet head, and the second treatment liquid described in Table 4 was set in the spray head.

Then, the second treatment liquid described in Table 4 was discharged from the spray head onto the fabric, and the ink and the first treatment liquid described in Table 4 were discharged from the ink jet head onto the fabric in this order to produce a solid printed sample.

The discharge of each liquid was performed under 25° C. and 50% RH at the main scanning 540 dpi×sub-scanning 720 dpi. Note that dpi represents the number of ink droplets (dots) per 2.54 cm. The discharge frequency was set to 22.4 kHz.

Further, each liquid was discharged in a wet-on-wet manner. Specifically, the ink was applied in a wet-on-wet manner with respect to the second treatment liquid, and the first treatment liquid was applied in a wet-on-wet manner with respect to the ink. Further, the application intervals from the application of the second treatment liquid to the discharge of the ink and from the discharge of the ink to the discharge of the first treatment liquid were each set to 5 seconds. At this time, the residual moisture percentage of the fabric per unit area of the recording region was set to 90%. The adhesion amounts of the ink, the first treatment liquid, and the second treatment liquid were each set as 15 g/m².

Then, the fabric to which these liquids were applied was dried at 150° C. for 3 minutes by a belt conveying type dryer to obtain an image-formed product.

Example 2

Image forming was performed in the same manner as in Example 1 except that the second treatment liquid was discharged from the inkjet head.

Examples 3 to 19 and Comparative Examples 1 to 3

Image forming was performed in the same manner as in Example 2 except that the types of the fabric, the first treatment liquid, the ink, and the second treatment liquid, and the application conditions were changed as shown in Table 4. In Examples 3 and 7, Tetron Ponge ("Tetron" is a trademark of Toray Industries, Inc. and TEIJIN LIMITED) was used as the polyester cloth.

<Evaluation>

For Examples 1 to 19 and Comparative Examples 1 to 3, the ejection property of each first treatment liquid and the friction fastness, color density, and texture of the image-formed product were evaluated by the following methods.

(Ejection Property of First Treatment Liquid)

The ejection property of the first treatment liquid was evaluated based on the following criteria by observing liquid droplets at the time of ejection.

Excellent: there is no disturbance in the liquid droplets, and there is no problem at all Fair: there is a slight disturbance in the droplets for some nozzles, but there is no problem in quality Poor: there is a disturbance in the droplets causing quality problems such as image defects (Friction Fastness)

Each obtained image-formed products was subjected to a dry rubbing fastness test using a Type II tester in accordance with the conditions of JIS L0849 (2013), and evaluated. To be specific, the portion where the image was formed was rubbed with a cotton fabric 100 times back and forth across the 100 mm area in the transverse direction and the longitudinal direction under a load of 200 g. After the rubbing, the color adhered to the cotton fabric was evaluated by the following criteria.

Outstanding: almost no color transfer

Excellent: slight color transfer, but in good condition

Fair: color transfer occurs but is within the allowable range

Poor: color transfer that exceeds an allowable range occurs

Worse: significant color transfer, exceeding the allowable range

Fair or better is considered as in an acceptable range.

(Color Density)

The color density of the obtained image-formed product was measured with a spectrocolorimeter (manufactured by X-Rite, Inc.), and the K/S value was calculated. The K/S value is an index of the surface color density defined by the following expression.

$$K/S = (1-R)^2/2R \qquad \text{Kubelka-Munk Formula:}$$

(K is an absorption coefficient of light, and R is surface reflectance at wavelength 630 nm)

A larger K/S value means a higher color density, and a smaller K/S value means a lower color density.

Outstanding: K/S value is 9 or more

Excellent: K/S value is 8 or more and less than 9

Fair: K/S value is 5 or more and less than 8 but is within an allowable range

Poor: K/S value is 3 or more and less than 5, exceeding the allowable range

Worse: K/S value is less than 3, exceeding the allowable range

Fair or better is considered as in an acceptable range.

(Texture)

The texture was evaluated according to the following criteria.

Outstanding: there is no change in texture which is maintained suitable

Excellent: there is a slight change in texture, but in good condition

Fair: there is a change in texture but within an allowable range

Poor: there is a significant change in texture (becomes hard), exceeding the allowable range 5 The image forming conditions of Examples 1 to 19 and Comparative Examples 1 to 3 are listed in Table 4, and the evaluation results are listed in Table 5.

TABLE 4

| | Fabric | Second treatment liquid (Pretreatment liquid) — Type | Second treatment liquid — Viscosity (mPa·s) | Ink — Type | Ink — Viscosity (mPa·s) | Ink — Viscosity/surface tension | First treatment liquid (Post-treatment liquid) — Type | First treatment liquid — Viscosity (mPa·s) | First treatment liquid — Viscosity/surface tension | Viscosity difference (mPa·s) | M2/M1 | Pigment amount (Second resin) | Application method (Second treatment liquid) | Application method (First treatment liquid) | Drying | Application interval (Sec) | Residual moisture of fabric | Application order* |
|---|---|---|---|---|---|---|---|---|---|---|---|---|---|---|---|---|---|---|
| Ex. 1 | Cotton | B | 8 | A | 8 | 6.44 | A | 4.5 | 0.79 | 3.5 | 0.625 | Fair | Spray | IJ | Drying** | 5 | 90% | I |
| Ex. 2 | Cotton | | | | | | | | | | | | IJ | IJ | All wet-on-wet | 5 | 90% | I |
| Ex. 3 | Polyester | | | | | | | | | | | | IJ | IJ | All wet-on-wet | 5 | 70% | I |
| Ex. 4 | Cotton | | | | | | | | | | | | IJ | Spray | All wet-on-wet | 5 | 90% | I |
| Ex. 5 | Cotton | B | 8 | B | 10 | 8.89 | C | 8 | 6.97 | 2 | 0.625 | Fair | IJ | IJ | All wet-on-wet | 5 | 90% | I |
| Ex. 6 | Cotton | A | 4 | A | 8 | 6.44 | B | 6 | 4.74 | 2 | 0.625 | Fair | IJ | IJ | All wet-on-wet | 5 | 90% | I |
| Ex. 7 | Polyester | A | 4 | A | 8 | 6.44 | B | 6 | 4.74 | 2 | 0.625 | Fair | IJ | IJ | All wet-on-wet | 5 | 70% | I |
| Ex. 8 | Cotton | A | 4 | A | 8 | 6.44 | A | 4.5 | 0.79 | 3.5 | 0.625 | Fair | IJ | IJ | All wet-on-wet | 5 | 90% | 1 |
| Ex. 9 | Cotton | A | 4 | A | 8 | 6.44 | E | 6 | 8.1 | 2 | 0.625 | Fair | IJ | IJ | All wet-on-wet | 5 | 90% | I |
| Ex. 10 | Cotton | A | 4 | A | 8 | 6.44 | F | 6 | 8.29 | 2 | 0.625 | Fair | IJ | IJ | All wet-on-wet | 5 | 90% | I |
| Ex. 11 | Cotton | A | 4 | C | 12 | 9.65 | A | 4.5 | 0.79 | 7.5 | 0.625 | Fair | IJ | IJ | All wet-on-wet | 5 | 90% | I |
| Ex. 12 | Cotton | A | 4 | A | 8 | 6.44 | B | 6 | 4.74 | 2 | 0.625 | Fair | IJ | IJ | All wet-on-wet | 5 | 90% | II |
| Ex. 13 | Cotton | A | 4 | A | 8 | 6.44 | B | 6 | 4.74 | 2 | 0.625 | Fair | IJ | IJ | All wet-on-wet | 3 | 90% | I |
| Ex. 14 | Cotton | A | 4 | A | 8 | 6.44 | B | 6 | 4.74 | 2 | 0.625 | Fair | IJ | IJ | All wet-on-wet | 1 | 90% | I |
| Ex. 16 | Cotton | A | 4 | B | 10 | 8.89 | D | 7 | 6.97 | 3 | 0.375 | Poor | IJ | IJ | All wet-on-wet | 5 | 90% | I |
| Ex. 17 | Cotton | B | 8 | D | 10 | 6.44 | C | 8 | 6.97 | 2 | 0.5 | Poor | IJ | IJ | All wet-on-wet | 5 | 90% | I |
| Comp. Ex. 1 | Cotton | A | 4 | A | 8 | 6.44 | B | 6 | 4.74 | 2 | — | — | IJ | IJ | Drying*** | — | 3% | I |
| Comp. Ex. 2 | Cotton | B | 8 | B | 8 | 6.44 | C | 8 | 6.97 | 0 | — | — | IJ | IJ | All wet-on-wet | 5 | 90% | I |
| Ex. 18 | Cotton | A | 4 | B | 10 | 8.89 | G | 8 | 6.97 | 2 | 1.25 | Fair | IJ | IJ | All wet-on-wet | 5 | 90% | I |

TABLE 4-continued

| | | Second treatment liquid (Pretreatment liquid) | | Ink | | | First treatment liquid (Post-treatment liquid) | | | | | Pigment amount (Second resin) | Application method (Second treatment liquid) | Application method (First treatment liquid) | Application conditions | | | |
|---|---|---|---|---|---|---|---|---|---|---|---|---|---|---|---|---|---|---|
| | Fabric | Type | Viscosity (mPa · s) | Type | Viscosity (mPa · s) | Viscosity/ surface tension | Type | Viscosity (mPa · s) | Viscosity/ surface tension | Viscosity difference (mPa · s) | M2/M1 | | | | Drying | Application interval (Sec) | Residual moisture of fabric | Application order* |
| Comp. Ex. 3 | Cotton | A | 4 | A | 8 | 6.44 | H nonionic | 6 | 4.74 | 0 | — | — | IJ | IJ | All wet-on-wet | 5 | 90% | I |
| Ex. 19 | Cotton | A | 4 | A | 8 | 6.44 | D | 7 | 6.97 | 1 | 0.375 | Poor | IJ | IJ | All wet-on-wet | 5 | 90% | I |

*Application order I: Second treatment liquid to ink to first treatment liquid, II: First treatment liquid to ink to second treatment liquid
**Drying only after second treatment liquid application
***Drying after pretreatment application/ink application

TABLE 5

| | Evaluation | | | | |
|---|---|---|---|---|---|
| | First treatment liquid ejection property | Friction fastness | Color density | Texture | Comprehensive evaluation |
| Ex. 1 | Fair | Fair | Fair | Fair | Fair |
| Ex. 2 | Fair | Excellent | Excellent | Excellent | Fair |
| Ex. 3 | Fair | Excellent | Excellent | Excellent | Fair |
| Ex. 4 | Fair | Fair | Excellent | Excellent | Fair |
| Ex. 5 | Fair | Excellent | Excellent | Excellent | Fair |
| Ex. 6 | Fair | Excellent | Outstanding | Outstanding | Fair |
| Ex. 7 | Fair | Excellent | Outstanding | Outstanding | Fair |
| Ex. 8 | Fair | Excellent | Outstanding | Outstanding | Fair |
| Ex. 9 | Excellent | Excellent | Outstanding | Outstanding | Fair |
| Ex. 10 | Excellent | Excellent | Outstanding | Outstanding | Fair |
| Ex. 11 | Fair | Fair | Outstanding | Outstanding | Fair |
| Ex. 12 | Fair | Excellent | Outstanding | Outstanding | Fair |
| Ex. 13 | Fair | Outstanding | Outstanding | Outstanding | Fair |
| Ex. 14 | Fair | Outstanding | Outstanding | Outstanding | Fair |
| Ex. 16 | Fair | Fair | Excellent | Outstanding | Fair |
| Ex. 17 | Fair | Fair | Excellent | Outstanding | Fair |
| Comp. Ex. 1 | Fair | Worse | Poor | Poor | Poor |
| Comp. Ex. 2 | Fair | Poor | Poor | Poor | Poor |
| Ex. 18 | Fair | Fair | Excellent | Fair | Fair |
| Comp. Ex. 3 | Fair | Worse | Poor | Poor | Poor |
| Ex. 19 | Fair | Fair | Fair | Fair | Fair |

From Tables 4 and 5, it can be seen that in Comparative Example 1 in which at least the ink and the first treatment liquid were not applied to each other in a wet-on-wet manner, the friction fastness of the image-formed product was low. This is presumed to be because the second resin in the first treatment liquid did not easily come into contact with the first resin in the ink and did not sufficiently aggregate.

In addition, it can be seen that, in Comparative Example 2 in which the viscosity of the first treatment liquid was the same as the viscosity of the ink, the friction fastness of the image-formed product was low even when the wet-on-wet application was performed. In addition, it can also be seen that in Comparative Example 3 in which the first treatment liquid contains a nonionic water-dispersible resin, sufficient friction fastness cannot be obtained. The reason therefor is considered to be that the resin does not interact or react with the first resin in the ink or the cationic substance in the second treatment liquid and does not aggregate.

In contrast, it can be seen that the friction fastness of the image-formed products is high in Examples 1 to 19 in which at least the ink and the first treatment liquid are applied to each other by wet-on-wet application and the viscosity of the first treatment liquid is set lower than the viscosity of the ink.

From these, it can be seen that at least the friction fastness can be improved by applying at least the ink and the first treatment liquid to each other in a wet-on-wet manner and setting the viscosity of the first treatment liquid to be lower than the viscosity of the ink.

Furthermore, it can be seen that by also applying the second treatment liquid in a wet-on-wet manner, the friction fastness, the color density, and the texture can be further improved (comparison between Examples 1 and 2).

In addition, it can be seen that the color density and the texture can be further improved by setting the the viscosities as follows: second treatment liquid<first treatment liquid<ink (comparison between Examples 2, 6, and 8).

Furthermore, it can be seen that as the application interval is shortened, the friction fastness becomes higher (comparison between Examples 6, 13, and 14).

Further, it can be seen that setting the difference in viscosity between the first treatment liquid and the ink to 5 mPa·s or less can further improve the friction fastness (comparison between Examples 8 and 11). It can be seen that setting the difference in viscosity between the first treatment liquid and the ink to 2 mPa·s or more can further improve at least the friction fastness (comparison between Examples 6, 8, and 19).

In addition, it can be seen that when the amount of the second resin in the first treatment liquid is set to be smaller than the amount of the first resin in the ink, the texture can be more favorably maintained (comparison between Examples 16 and 18). The reason therefor is considered to be that as the amount of the second resin is smaller than that of the first resin, the image-formed product is less likely to become hard.

In addition, it can be seen that when the average value of the viscosity/surface tension of the water-soluble organic solvent in the first treatment liquid is larger than the average value of the viscosity/surface tension of the water-soluble organic solvent in the ink or the second treatment liquid, the ejection property of the first treatment liquid is further improved (comparison between Examples 6, 9, and 10).

INDUSTRIAL APPLICABILITY

The present invention can provide an image forming method and an ink set for ink jet textile printing capable of forming an image having high friction fastness.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming method, comprising:
applying an ink and a first treatment liquid onto a fabric in a wet-on-wet manner to each other, the ink containing a pigment and a first resin, the first treatment liquid containing a second resin that reacts with or interacts with the first resin to aggregate, wherein
a second treatment liquid containing an aggregating agent that aggregates the first resin is further applied, and the second treatment liquid and the ink are applied in the wet-on-wet manner to each other, a viscosity of the first treatment liquid at 25° C. is lower than a viscosity of the ink at 25° C., a viscosity of the second treatment liquid at 25° C. is lower than the viscosity of the first treatment liquid at 25° C., and wherein in the applying in the wet-on-wet manner, the second treatment liquid, the ink, and the first treatment liquid are applied onto the fabric in this order.

2. The image forming method according to claim 1, wherein a difference between the viscosity of the first treatment liquid at 25° C. and the viscosity of the ink at 25° C. is 2 to 5 mPa·s.

3. The image forming method according to claim 1, wherein the aggregating agent contains a cationic substance;

the first resin contains an anionic resin; and the second resin contains a cationic resin.

4. The image forming method according to claim 1, wherein each of the first treatment liquid, the ink, and the second treatment liquid contains a water-soluble organic solvent and water.

5. The image forming method according to claim 4, wherein:

each of the water-soluble organic solvents respectively contained in the second treatment liquid, the ink, and the first treatment liquid contains a polyhydric alcohol having a boiling point of 180° C. or higher;

a content of the polyhydric alcohol in the first treatment liquid is less than a content of the polyhydric alcohol in the ink; and a content of the polyhydric alcohol in the second treatment liquid is less than the content of the polyhydric alcohol in the first treatment liquid.

6. The image forming method according to claim 1, wherein when a content of the first resin in the ink is M1 and a content of the second resin in the first treatment liquid is M2, M2/M1 is 0.1 to 0.7.

7. The image forming method according to claim 1, wherein a content of the pigment in the ink is less than a content of the second resin in the first treatment liquid.

8. The image forming method according to claim 1, wherein an application interval between the second treatment liquid and the ink and an application interval between the ink and the first treatment liquid are each 3 seconds or less.

9. The image forming method according to claim 4, wherein an average value of a viscosity/surface tension ratio of the water-soluble organic solvent contained in the first treatment liquid is more than an average value of a viscosity/surface tension ratio of the water-soluble organic solvent contained in the ink.

10. An ink set for ink jet textile printing, the ink set comprising:

an ink containing a pigment, a first resin, a water-soluble organic solvent, and water; and a first treatment liquid containing, a second resin, a water-soluble organic solvent, and water, the second resin reacting with or interacting with the first resin to aggregate;

a second treatment liquid containing an aggregating agent, a water-soluble organic solvent, and water, the aggregating agent aggregating the first resin, wherein a viscosity of the first treatment liquid at 25° C. is lower than a viscosity of the ink at 25° C., a viscosity of the second treatment liquid at 25° C. is lower than the viscosity of the first treatment liquid at 25° C., wherein the first treatment liquid is a post-treatment liquid to be applied after the ink is applied, and the second treatment liquid is a pretreatment liquid to be applied before the ink is applied.

11. The ink set according to claim 10, wherein a difference between the viscosity of the first treatment liquid at 25° C. and the viscosity of the ink at 25° C. is 2 to 5 mPa·s.

12. The ink set according to claim 10, wherein:

the aggregating agent contains a cationic substance;

the first resin contains an anionic resin; and the second resin contains a cationic resin.

13. The ink set according to claim 10, wherein:

each of the water-soluble organic solvents respectively contained in the second treatment liquid, the ink, and the first treatment liquid contains a polyhydric alcohol having a boiling point of 180° C. or higher;

a content of the polyhydric alcohol in the first treatment liquid is less than a content of the polyhydric alcohol in the ink; and a content of the polyhydric alcohol in the second treatment liquid is less than the content of the polyhydric alcohol in the first treatment liquid.

14. The ink set according to claim 10, wherein when a content of the first resin in the ink is M1 and a content of the second resin in the first treatment liquid is M2, M2/M1 is 0.1 to 0.7.

15. The ink set according to claim 10, wherein an average value of a viscosity/surface tension ratio of the water-soluble organic solvent contained in the first treatment liquid is more than an average value of a viscosity/surface tension ratio of the water-soluble organic solvent contained in the ink.

* * * * *